(12) United States Patent
Wang

(10) Patent No.: US 6,483,940 B1
(45) Date of Patent: Nov. 19, 2002

(54) METHOD FOR DIVIDING IMAGE

(75) Inventor: Tachun Wang, Taipei (TW)

(73) Assignee: Institute for Information Industry (TW)

( * ) Notice: Subject to any disclaimer, the term of this patent is extended or adjusted under 35 U.S.C. 154(b) by 0 days.

(21) Appl. No.: 09/358,680

(22) Filed: Jul. 22, 1999

(51) Int. Cl.$^7$ ................................................ G06K 9/00
(52) U.S. Cl. ...................... 382/164; 382/170; 382/171; 358/515; 358/538
(58) Field of Search ............................... 382/164, 170, 382/171, 225; 358/538, 515

(56) References Cited

U.S. PATENT DOCUMENTS

| | | | | |
|---|---|---|---|---|
| 5,047,842 A | * | 9/1991 | Bouman, Jr. et al. | 358/75 |
| 5,649,025 A | * | 7/1997 | Revankar | 382/171 |
| 5,848,181 A | * | 12/1998 | Ogata | 382/169 |
| 5,889,885 A | * | 3/1999 | Moed et al. | 382/172 |
| 5,930,385 A | * | 7/1999 | Fujimoto et al. | 382/162 |
| 5,933,524 A | * | 8/1999 | Schuster et al. | 382/168 |
| 6,148,102 A | * | 11/2000 | Stolin | 382/164 |
| 6,175,427 B1 | * | 1/2001 | Lehmbeck et al. | 358/1.9 |
| 6,181,817 B1 | * | 1/2001 | Zabih et al. | 382/170 |
| 6,195,458 B1 | * | 2/2001 | Warnick et al. | 382/173 |
| 6,272,250 B1 | * | 8/2001 | Sun et al. | 382/225 |
| 6,282,317 B1 | * | 8/2001 | Luo et al. | 382/203 |
| 6,310,967 B1 | * | 10/2001 | Heine et al. | 382/128 |

* cited by examiner

Primary Examiner—Joseph Mancuso
Assistant Examiner—Anand Bhatnagar
(74) Attorney, Agent, or Firm—Baker Botts LLP

(57) ABSTRACT

The method proposed by the present invention divide an image into a plurality of cluster regions, each has its own principle color. The method mentioned above includes the following steps. At first, acquire a three dimensional histogram of the image by counting the number of pixels of the image based on three dimensional color coordinate. Then smooth the three dimensional histogram by a numerical method to obtain a function. Next, define a plurality of cluster regions on the image. Subsequently, assign the color of each pixel of the image as a principle color of a first cluster region among the plurality of cluster regions. The principle color is equal to average of all pixels within the cluster region, the average is equal to A/B, wherein A is summation of color of pixels within the first cluster region, and B is equal to the number of pixels within the first cluster region. Each of the plurality of cluster regions has a corresponding principle color. Finally, joint an unclassified pixel to a cluster region of the plurality of cluster regions according to minimum distance from the unclassified pixel to the plurality of cluster regions. The unclassified pixel is outside the plurality of cluster regions before this joint step, after all pixels of the image have being jointed to one of the plurality of cluster regions, the image is divided into the plurality of cluster regions.

14 Claims, 3 Drawing Sheets

METHOD FOR DIVIDING IMAGE

BACKGROUND OF THE INVENTION

1. Field of the Invention

This invention relates to a method for dividing image by descending number of color, and more particularly, to a method for dividing image in accordance with inflection on a distribution curve of image pixel versus color coordinate.

2. Description of the Prior Art

When a traditional technology is used to divide an image, pixels of similar color are classified into a cluster region, so an image can be classified into a plurality of cluster regions. Finally, if any pixel is not classified into one of the existed cluster regions, determine the distance between the color of the pixel and that of every existed cluster region. Then joint the pixel to the existed cluster that has the shortest distance of color to the pixel, in other words, the pixel is classified into the cluster. So the color of the pixel is replaced with the color of the color of the existed cluster that has shortest distance to the pixel mentioned above. So all the pixels of the image are classified into the plurality of cluster regions.

The color histogram of an image is frequently used in dividing an image into a plurality of cluster regions, especially the color of a region having a local maximum within the color histogram is assigned as the principal color of the cluster region. When dividing an image into several cluster regions, the relation between the image mentioned above and its color histogram is shown in FIG. 1. The image 1 includes a plurality of pixels, and the statistic for the number of pixel having a color on color coordinate acquires its color histogram 2. Then find a first local maximum value 3, and set up first threshold value 4. Next, by the same way, a second local maximum value 5, its second threshold value 6, the third local maximum value 7, its third threshold value 8, the fourth local maximum value 9, and its fourth threshold value 10. Every local maximum value is actually a value on the color coordinate. Subsequently, assign the color of the pixel having the local maximum value to be the color of the pixels of the cluster region enclosing the pixel having the local maximum value. In other words, the principle color of a cluster region is assigned to be the color of the pixel enclosed by the cluster region, which having the local maximum value. Next, calculate the distance from the color of the pixel beyond the plurality of cluster regions to the plurality of local maximum values. So a plurality of distance is acquired, then select a minimum distance from the plurality of distance. The principle color of the cluster region having the minimum distance to the pixel beyond the plurality of cluster regions is assigned as the color of the pixel beyond the plurality of cluster regions. Then it is defined that the pixel beyond the plurality of cluster regions is joint to a cluster region which having minimum distance to the pixel. Also, it is defined that, the pixel is classified to a cluster region. Proceeding with the steps mentioned above continuously until all the pixels of the image is classified into one of the existed cluster regions. Through the steps mentioned above, thus obtain a plurality of cluster regions which including all pixels of image 1. For example, as shown in FIG. 1, the first cluster region 13 in image 1 includes the pixels having the color the same as the principle color of the first local maximum value 3 illustrated in the color histogram 2. Similarly, the second cluster region 15 in image 1 includes the pixels having the color the same as the principle color of the second local maximum value 5 illustrated in the color histogram 2. The third cluster region 17 in image 1 includes the pixels having the color the same as the principle color of the first local maximum value 7 illustrated in the color histogram 2. The fourth cluster region 19 in image 1 includes the pixels having the color the same as the principle color of the fourth local maximum value 9 illustrated in the color histogram 2.

The colorful-image dividing method mentioned above is a technology utilizing a moving window to look for a local maximum value in the color histogram. Because the colorful-image dividing method mentioned above does not analysis the color histogram according to the feature of color distribution, thus the obtained principle colors does not fully match the color distribution of the image. Furthermore, the size of the moving window as well as the threshold values are the fixed values set up by the user, i.e., the window size and the threshold values are not set up according to the actual color distribution. So the exactly color distribution can not be obtained, and the resulted color division does not actually fit the color distribution of the colors on the image. Also, the division does not fit the actual color distribution, so the resulted principle color of the cluster region is not correct. In conclusion, the traditional method mentioned above can not properly reduce the number of color of the image.

SUMMARY OF THE INVENTION

According to the prior art mentioned above, the traditional method utilized to divide a pre-processed image utilize the manually determined threshold value as the criterion when dividing the image, so it is impossible to divide the image according to the characteristic of color distribution of the pre-processed image. Thus the traditional method can not divide the image correctly.

A purpose of the present invention is to avoid using the fixed threshold value to divide the image, instead, the present invention uses the convex portion of a function to obtain the plurality of cluster regions. The function mentioned above is obtained by a smoothed histogram of the image, so the cluster regions are acquired according to the characteristic of the distribution of color of the pre-processed image. The present invention is used to divide a pre-processed image into a plurality of cluster regions, such that all the pixels of the pre-processed image are classified into any one of the plurality of cluster regions. In other words, the pre-processed image is divided into a plurality of cluster regions.

According to the purpose mentioned above, the method used to divide an image is disclosed herein. The method divide an image into a plurality of cluster regions, each has its own principle color, and every pixel of the image is classified into one of the plurality of cluster regions. The method mentioned above includes the following steps.

At first, acquire a three dimensional histogram of the image by counting the number of pixels of the image based on three dimensional color coordinate. Then smooth the three dimensional histogram by a numerical diffusion method to obtain a function. The function can be a normal distribution probability function. Next, define a plurality of cluster regions on the image, thus the pixels within the plurality of cluster regions correspond to convex portion of the function. Subsequently, assign the color of each pixel of the image as a principle color of a first cluster region among the plurality of cluster regions. The principle color is equal to average of all pixels within the cluster region, the average is equal to A/B, wherein A is summation of color of pixels within the first cluster region, and B is equal to the number of pixels within the first cluster region. The color of the pixel is represented by the three color coordinate, and each of the plurality of cluster regions have a corresponding principle color. Finally, joint an unclassified pixel to a cluster region of the plurality of cluster regions according to minimum distance from the unclassified pixel to the plurality of cluster regions. The unclassified pixel is outside the plurality of cluster regions before this joint step, after all pixels of the image have being jointed to one of the plurality of cluster regions, the image is divided into the plurality of cluster regions.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

At first, in the preferred embodiment of the present invention, the statistic method is used to analyze the colorful image, thus a plurality of cluster regions can be defined according to the actual distribution of a plurality of colors. Subsequently, calculate the average value of the color of the pixels within every individual cluster region, and take the average value as the principle color of the individual cluster region. In the present invention, because the window size and the threshold value are not manually set up, the resulted color distribution stands for the exact feature of the color distribution of the image. The method proposed in the preferred embodiment of the present invention mentioned above is detailed below in FIG. 2. Firstly, as shown in step 30 "get a 3-dimensional histogram from an image pixels' distribution on 3-dimensional coordinate", analyze the 3-dimensional distribution of pixels of an image, and get a 3-dimensional histogram of the image. The first step mentioned above analyze every pixel of the image according to the pixel's color composition, and get a corresponding position in a 3-dimensional coordinate (such as color coordinate: RGB, HSV or YUV . . . etc.). After all the pixels of the image of have been processed by the step mentioned above, calculating the number of pixels on every position of the 3-dimensional color coordinate. Thus the color histogram of the image is acquired.

The following step is step 31 "estimate probability density function by diffusion smoothing method", which uses a numerical diffusion method to calculate the probability density function of the 3-dimensional histogram of the image. The obtained probability density function is a function inverse proportional to the nature log of a squared coordinate. For example, the one dimensional probability density function can be expressed as $e^{-x^2/\sigma^2}$, which is known as the normal distribution that is a well-known probability density function. Besides, the numerical diffusion method is a method frequently used in thermodynamics, whereas the numerical diffusion method is used to smooth the color histogram of the colorful image in the preferred embodiment of the present invention.

Figure 1:
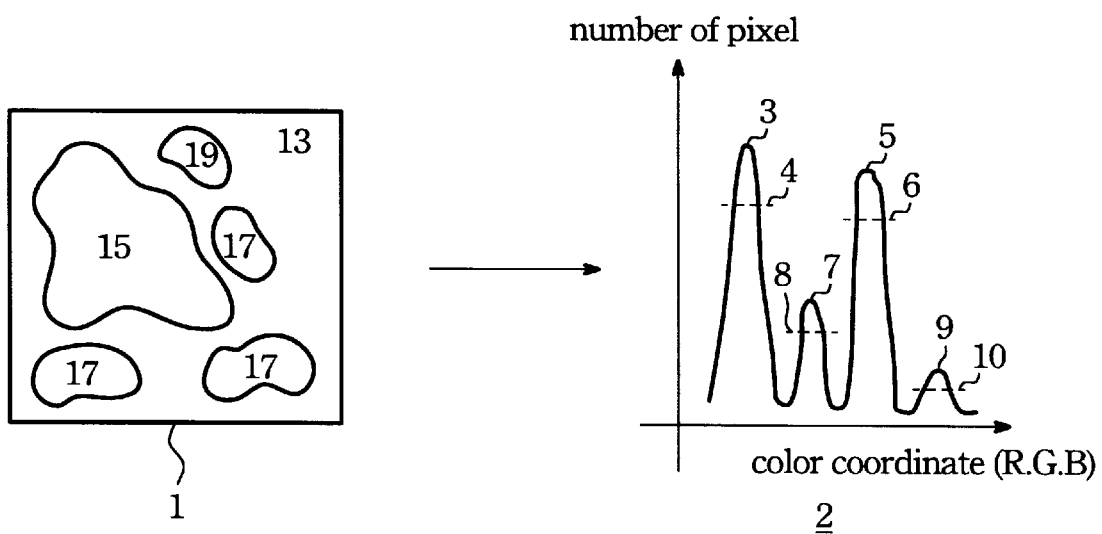
FIG. 1 illustrates the relation between the divided image and the histogram utilized to define the cluster regions of the image, furthermore the pixels defined by a local maximum value and its threshold on the histogram related to a corresponding cluster region.

The next step—step 32 "acquire the convex portion to define the cluster region of the colorful image", is used to acquire a plurality of the cluster regions of the colorful image by determining the convex portion of the probability density. The relation between the convex portion (above threshold value) of the histogram and the cluster region of the colorful image had been illustrated in FIG. 1. Similar to foregoing description about the convex portion and the cluster region, in the preferred embodiment of the present invention, a plurality of cluster regions can be obtained by proceeding with the histogram of the colorful image by step 32. Thus the colorful image is divided into a plurality of cluster regions. The next step is step 33 "average the value of color of pixels by the number of pixels within every individual cluster region". The aim of step 33 is to determine the principle color of every individual cluster region, and then assign the principle color as the color of every pixel within the cluster region. So the value of color of every pixel within a specific cluster region is assigned as the value of the principle color on the color coordinate. In step 33, the average is performed as the follow description. Assume a cluster region includes a number (n1) of first pixels having first color coordinate (c1) and a number (n2) of second pixels having second color coordinate (c2). Step 33 is to divide the summation of the value of color of all pixels within a cluster region by the summation of the number of the first pixel and the second pixel, in other words, the result can be expressed as (c1×n1+c2×n2)/(n1+n2). The summation of the value of color of all pixels within a cluster region can be obtained by multiplying the value of color of the first pixel by the number of the first pixel plus multiplying the value of color of the second pixel by the number of the second pixel.

The principle color of every existed cluster region of the image can be obtained by performing step 33, and the pixels belonging to none of the existed cluster region should be processed with step 34. Step 34 "classify every pixel outside any one of existed cluster regions into any one of the existed cluster region" is to classify the pixels outside any existed cluster region into any one of the existed cluster regions. The method used in step 34 is continuously classify the pixel outside the existed cluster region into any one of the existed cluster regions till all the pixels are classified. In the preferred embodiment of the present invention, a pixel outside any one of the existed cluster regions can be classified into a cluster region as the description below. Determine the minimum distance from the color of the unclassified pixel to the principle color of every existed cluster region; then classify the unclassified pixel into the cluster region that has the minimum distance to the pixel. Continue the classifying step mention above till all the unclassified pixels are classified (joint) to one of the existed cluster regions. The division of the image is finished after step 34 had been performed. Because the number of color of the colorful image having been divided by the method in the present invention is reduced, the present invention can also be used to reduce the number of color of a colorful image when dividing the image.

It is noted that although the preferred embodiment of the present invention mentioned above is to proceed with colorful image, however it can be used to process the monotone image. During processing a monotone image, the variation of the present invention for the monotone image is to process the gray level of the monotone image. In spite of the variation mentioned above, the method utilized to divide a colorful image is basically the same as the method utilized to divide a monotone image. In other words, if the image is composed of a single color, the step 30 "get a 3-dimensional histogram from an image pixels' distribution on 3-dimensional coordinate" should be replaced with the step "get a gray level histogram from an image pixels' distribution on gray level coordinate". In the following steps, the "colorful image" should be replaced with the "single color image", and then the method shown in FIG. 2 that is utilized to process a colorful image can be used to process a monotone image.

Figure 2:
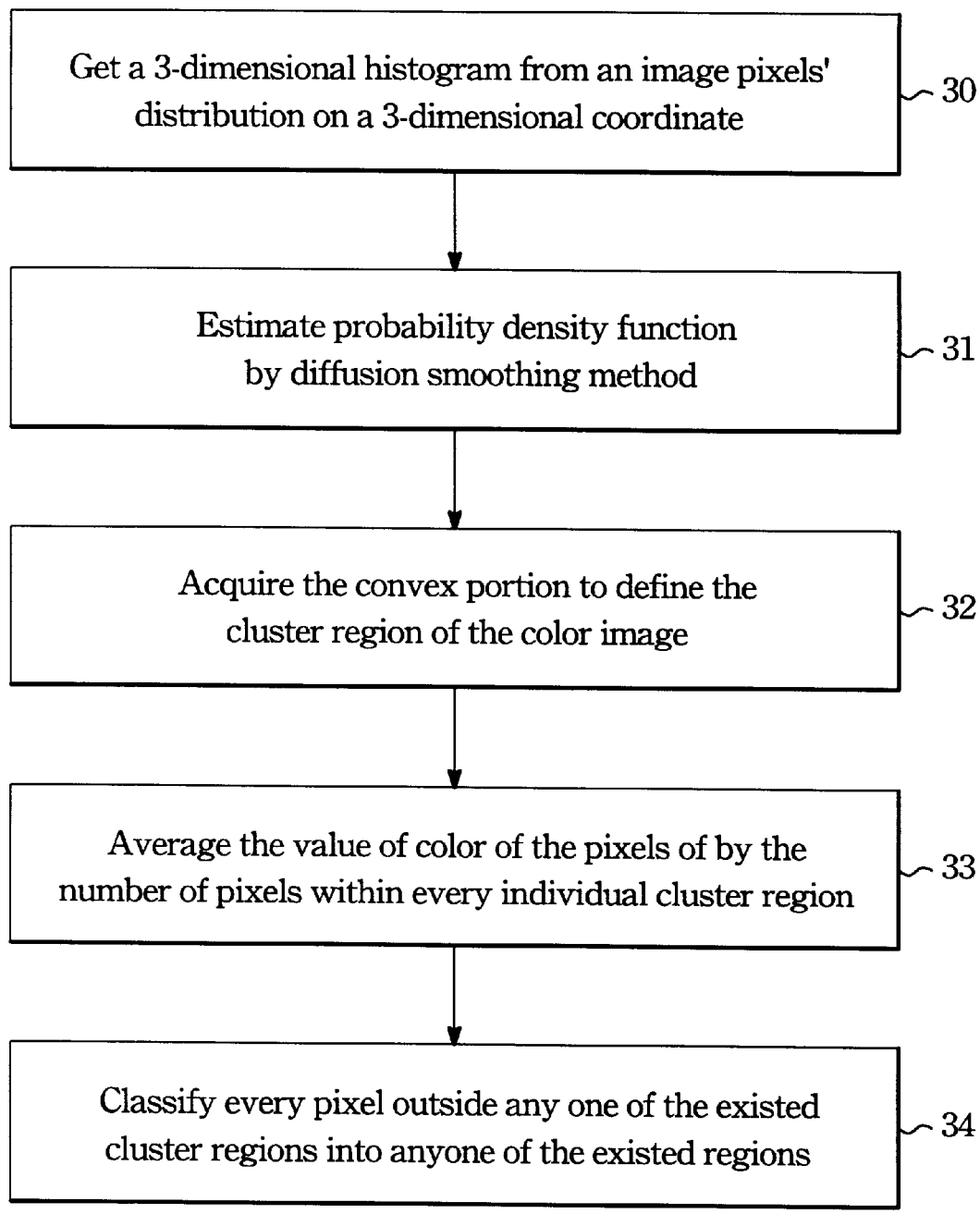
FIG. 2 illustrates the steps utilized to divide an image according to one preferred embodiment of the present invention.

Because the method utilized in dividing a monotone image is basically the same as that utilized in dividing a colorful image, the step utilized to divide the monotone image is not shown in figure due to the similarity to FIG. 2. The method utilized in dividing a monotone image is to divide a monotone image into a plurality of cluster regions such that every pixel of the monotone image is classified into any one of the cluster regions. The method used to divide the monotone image includes basically the following steps. At first, the statistic method is used to analyze the monotone image, thus a plurality of cluster regions can be defined according to the actual distribution of a plurality of colors. Subsequently, calculate the average value of the gray level of the pixels within every individual cluster region, and take the average value as the principle gray level of the individual cluster region. Next, step "get a gray level histogram from an image pixels' distribution on every position of gray level coordinate", analyze the gray level distribution of pixels of an image, and get a gray level histogram of the image. The first step mentioned above analyze every pixel of the image according to the pixel's gray level, and get a corresponding position in a gray level coordinate. After all the pixels of the image have been processed by the step mentioned above, calculate the number of pixels on every position of the gray level coordinate. Thus the gray level histogram of the image is acquired. The following step is "estimate probability density function by diffusion smoothing method", which uses a numerical diffusion method to calculate the probability density function of the gray level histogram of the image. The next step "acquire the convex portion to define the cluster region of the monotone image", is used to acquire a plurality of cluster regions of the monotone image by determining the convex portion of the probability density function. Thus the monotone image is divided into a plurality of cluster regions. The next step is step "average the gray level value of pixels by the number of pixels within every individual cluster region". The aim of the step mentioned above is to determine the principle gray level of every individual cluster region, and then assign the principle gray level as the gray level of every pixel within the cluster region. So the gray level value of every pixel within a specific cluster region is assigned as the gray level value on the gray level coordinate. In foregoing step, the average is performed by the follow description. Assume a cluster region includes a number (n1) of first pixels having first gray level (g1) and a number (n2) of second pixels having second gray level (g2). The foregoing step is to divide the summation of the gray level value of all pixels within a cluster region by the summation of the number of the first pixel and the second pixel, in other words, the result can be expressed as (g1×n1+g2×n2)/(n1+n2). The summation of the gray level value of all pixels within a cluster region can be obtained by multiplying the gray level value of the first pixel by the number of the first pixel plus multiplying the gray level value of the second pixel by the number of the second pixel. The principle gray level of every existed cluster region of the image can be obtained, and the pixels belonging to none of the existed cluster region should be processed with the following step: classify every pixel outside any one of existed cluster regions into any one of the existed cluster regions. The step "classify every pixel outside any one of existed cluster regions into any one of the existed cluster regions" is to classify the pixels outside any existed cluster region into any one of the existed cluster regions. The method mentioned above is continuously classify the pixel outside the existed cluster region into any one of the existed cluster regions till all the pixels are classified. In the preferred embodiment of the present invention, a pixel outside any one of the existed cluster regions can be classified into a cluster region as the description below. The method mentioned above is used to process the monotone image according to the present invention.

The other preferred embodiment of the present invention is used to divide the colorful image by the other way, which uses the method that is utilized to divide a monotone image. The other preferred embodiment of the present invention firstly divide the image based on a first primary color coordinate (such as Red coordinate), subsequently, divide the image based on a second primary color coordinate (such as Green coordinate), next, divide the image based on a third primary color coordinate (such as Blue coordinate). In the following step, acquire the 3-dimensional coordinate of every pixel from the pixel's position relating to the three independent coordinates (such as R coordinate, G coordinate, and B coordinate), so the three-dimensional color coordinate of a pixel is acquired, and every pixel is then colorful. Thus the division of the colorful image relating to the three color coordinates is finished. Because the method utilized to divide a one-color image is the same as that utilized in the other preferred embodiment of the present invention. The only difference is that the other preferred embodiment of the present invention respectively process the colorful image based on the three primary colors so as to acquire the distribution of every pixel of the colorful image in the three primary colors. So the method according to the preferred embodiment of the present invention is not illustrated in figure, instead, the method mentioned in the other preferred embodiment is described.

The method proposed by the other preferred embodiment of the present invention mentioned above is to divide a colorful image into a plurality of cluster regions, such that the pixel of the colorful image is joint to any one of the plurality of cluster regions. The method proposed by the other preferred embodiment of the present invention includes the following steps.

Firstly, divide the pre-processed image (colorful image before processing) according to the first color coordinate by the steps as follows: Firstly, analyze the first color distribution of pixels of an image, and get a first histogram of the image. The step mentioned above analyze every pixel of the image according to the pixel's value on the first color coordinate, and get a corresponding position in the first coordinate. After all the pixels of the image have been processed by the step mentioned above, calculate the number of pixels on every position of the first color coordinate. Thus the first color histogram of the image is acquired. The following step uses a numerical diffusion method to estimate the first function of the first color histogram of the image. Next, by determining the convex portion of the first function, a plurality of cluster regions of the image based on the first color coordinate are acquired. Thus the image is divided into a plurality of the first type cluster regions. The next step is to divide the total value of the pixels on the first color coordinate by the number of pixels within every individual first type cluster region. The aim of the step mentioned above is to determine the first principle color of every individual first type of cluster region, and then assign the first principle color as the value of the first color coordinate of every pixel within the first type cluster region. So the first color coordinate value of every pixel within a specific first type cluster region is assigned as the first color coordinate value on the first color coordinate. In the foregoing step, the average is performed by the follow description. Assume a first type cluster region includes a number (n1) of first pixels having first color coordinate (p1) and a number (n2) of second pixels having second color coordinate (p2). Then divide the summation of the first color coordinate value of all pixels within a cluster region by the summation of the number of the first pixel and the second pixel, in other words, the result can be expressed as (p1×n1+p2×n2)/(n1+n2). The summation of the value of the first color coordinate of all pixels within a first type cluster region can be obtained by multiplying the value of the first color coordinate of the first pixel by the number of the first pixel plus multiplying the value of the second color coordinate of the second pixel by the number of the second pixel. The first principle color of every existed cluster region of the image can be obtained, and the pixels belonging to none of the existed cluster region should be processed with the following step. Classify every pixel outside any one of the existed first type cluster regions into any one of the existed first type cluster regions. The step mentioned above is to classify the pixels outside any existed first type cluster region into any one of the existed first type cluster regions. The method mentioned above is to continuously classify the pixel outside the existed first type of the first type cluster region into any one of the existed first type cluster regions till all the pixels are classified. In the other preferred embodiment of the present invention detailed above, a pixel outside all the existed first type cluster regions can be classified into a first type cluster region.

In the following step of the other preferred embodiment of the present invention, the pre-processed image (colorful image before processing) is divided according to the second color coordinate by the steps as follows. Firstly, analyze the second color distribution of pixels of an image, and get a second histogram of the image. The step mentioned above analyze every pixel of the image according to the pixel's value on the second color coordinate, and get a corresponding position in the second coordinate. After all the pixels of the image have been processed by the step mentioned above, calculate the number of pixels on every position of the second color coordinate. Thus the second color histogram of the image is acquired. The following step uses a numerical diffusion method to estimate the second function of the second color histogram of the image. Next, by determining the convex portion of the second function, a plurality of cluster regions of the image based on the second color coordinate are acquired. Thus the image is divided into a plurality of the second type cluster regions. The next step is to divide the total value of the pixels on the second color coordinate by the number of pixels within every individual second type cluster region. The aim of the step mentioned above is to determine the second principle color of every individual second type of cluster region, and then assign the second principle color as the value of the second color coordinate of every pixel within the second type cluster region. So the second color coordinate value of every pixel within a specific second type cluster region is assigned as the second color coordinate value on the second color coordinate. In the foregoing step, the average is performed by the follow description. Assume a second type cluster region includes a number (n1) of first pixels having second color coordinate (q1) and a number (n2) of second pixels having second color coordinate (q2). Then divide the summation of the second color coordinate value of all pixels within a cluster region by the summation of the number of the first pixel and the second pixel, in other words, the result can be expressed as (q1×n1+q2×n2)/(n1+n2). The summation of the value of the second color coordinate of all pixels within a second type cluster region can be obtained by multiplying the value of the second color coordinate of the first pixel by the number of the first pixel plus multiplying the value of the second color coordinate of the second pixel by the number of the second pixel. The second principle color of every existed cluster region of the image can be obtained, and the pixels belonging to none of the existed cluster region should be processed with the following step. Classify every pixel outside any one of the existed second type cluster regions into any one of the existed second type cluster regions. The step mentioned above is to classify the pixels outside any existed second type cluster region into any one of the existed second type cluster regions. The method mentioned above is to continuously classify the pixel outside the existed second type of the second type cluster region into any one of the existed second type cluster regions till all the pixels are classified. In the other preferred embodiment of the present invention detailed above, a pixel outside all the existed second type cluster regions can be classified into a second type cluster region.

In the next step of the other preferred embodiment of the present invention, the pre-processed image (colorful image before processing) is divided according to the third color coordinate by the steps as follows. Firstly, analyze the third color distribution of pixels of an image, and get a third histogram of the image. The step mentioned above analyze every pixel of the image according to the pixel's value on the third color coordinate, and get a corresponding position in the third coordinate. After all the pixels of the image have been processed by the step mentioned above, calculate the number of pixels on every position of the third color coordinate. Thus the third color histogram of the image is acquired. The following step uses a numerical diffusion method to estimate the third function of the third color histogram of the image. Next, by determining the convex portion of the third function, a plurality of cluster regions of the image based on the third color coordinate are acquired. Thus the image is divided into a plurality of the third type cluster regions. The next step is to divide the total value of the pixels on the third color coordinate by the number of pixels within every individual third type cluster region. The aim of the step mentioned above is to determine the third principle color of every individual third type of cluster region, and then assign the third principle color as the value of the third color coordinate of every pixel within the third type cluster region. So the third color coordinate value of every pixel within a specific third type cluster region is assigned as the third color coordinate value on the third color coordinate. In the foregoing step, the average is performed by the follow description. Assume a third type cluster region includes a number (n1) of first pixels having third color coordinate (r1) and a number (n2) of third pixels having third color coordinate (r2). Then divide the summation of the third color coordinate value of all pixels within a cluster region by the summation of the number of the first pixel and the second pixel, in other words, the result can be expressed as (r1×n1+r2×n2)/(n1+n2). The summation of the value of the third color coordinate of all pixels within a third type cluster region can be obtained by multiplying the value of the third color coordinate of the first pixel by the number of the first pixel plus multiplying the value of the third color coordinate of the second pixel by the number of the second pixel. The third principle color of every existed cluster region of the image can be obtained, and the pixels belonging to none of the existed cluster region should be processed with the following step. Classify every pixel outside any one of the existed third type cluster regions into any one of the existed third type cluster regions. The step mentioned above is to classify the pixels outside any existed third type cluster region into any one of the existed third type cluster regions. The method mentioned above is to continuously classify the pixel outside the existed third type of the third type cluster region into any one of the existed third type cluster regions till all the pixels are classified. In the other preferred embodiment of the present invention detailed above, a pixel outside all the existed third type cluster regions can be classified into a third type cluster region.

Figure 3:
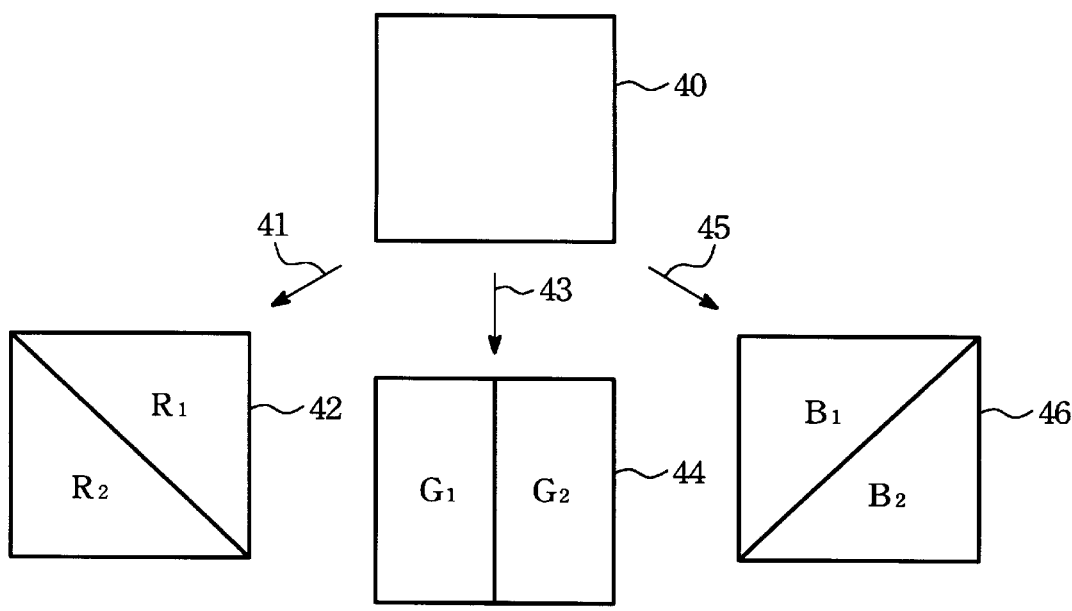
FIG. 3 illustrates the steps utilized to divide an pre-processed image according to the other preferred embodiment of the present invention, in which the pre-processed image is processed according to three color series respectively to acquire color distribution.

After the foregoing three steps utilized to process the first color coordinate, the second color coordinate, and the third color coordinate have been performed, the pre-processed image is divided according to the three color coordinates mentioned above. For example, as shown in FIG. 3, the pre-processed image 40 having processed by the first-color processing step 41 produces the first color distribution 42. Although the step 41 divide the image according to the first color, different coordinate relates to different color in spite of the same color series. Although the pre-processed image is divided according to the first color series, the cluster regions in the divided image can have different color. In other words, though the image is divided according to a first series, the principle color of each cluster region is different to each other. For example, when the pre-processed image is divided according to the red primary color, there can be a cluster region of heavy red and the other cluster region of light red.

In the foregoing example, assume the result of the division is first color distribution 42 having a first region R1 (of a first principle color) and a second region R2 (of a second principle color R2). In the example of the preferred embodiment of the present invention, assume the pre-processed image 40 is divided according to a second-color processing step 43, and the result is second color distribution 44 (including region G1 and G2). In addition, assume the pre-processed image 40 is divided according to a second-color processing step 45, and the result is second color distribution 46 (including region B1 and B2). Though there are only two principle colors in the divided image according to one color series in foregoing example, when it is used in realistic application, the divided image should have a plurality of principle colors.

After the pre-processed image had processed by the steps mentioned above, every pixel of the divided image corresponding to different colors is added. In other words, every pixel corresponding to the first color coordinate (e.g., red color series), the second color coordinate (e.g., green color series), and the third color coordinate (blue color series) is added. Because the three color coordinates are mutual independent, so the color of the added pixel is 3-dimensional such as (R, G, B). In the foregoing operation, the addition of different color coordinates is performed by logic "AND" operation, and the visual result is the mixture of the colors in the three color coordinates.

Figure 4:
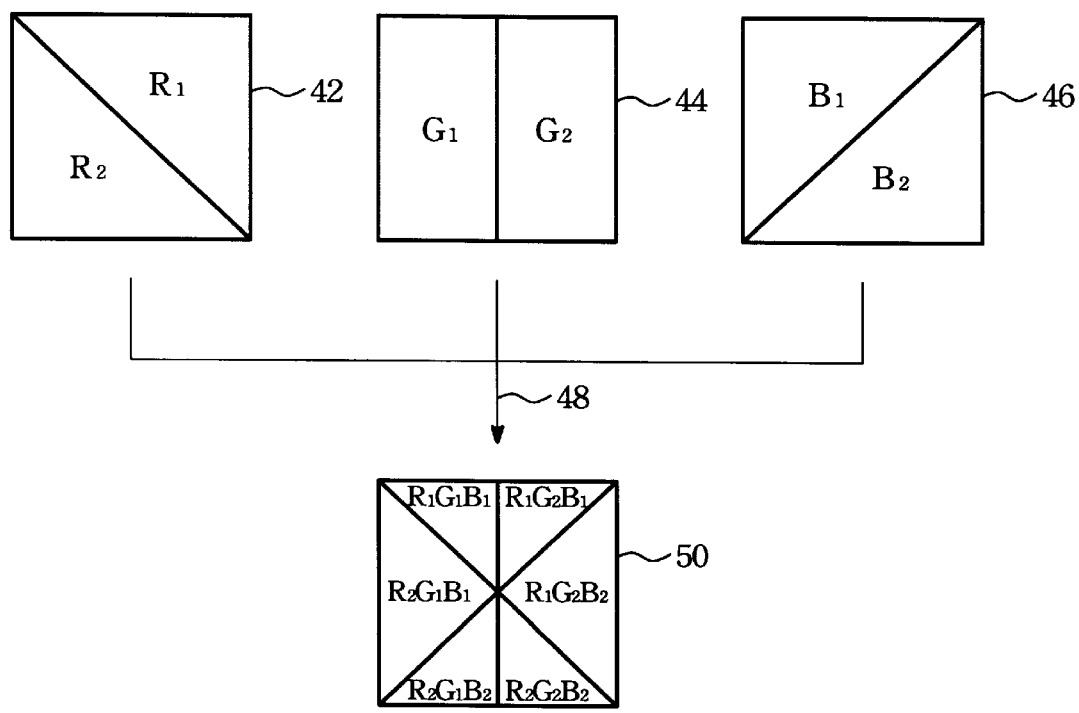
FIG. 4 illustrates the steps utilized to add the divided image according to the other preferred embodiment of the present invention, in which the divided images according to the three color coordinates are added, and the pixel of the added image each has 3-dimensional color coordinate.

In the preferred embodiment of the present invention illustrated in FIG. 3, after the pre-processed image has been divided according to the three primary color coordinates, the color distribution in each color coordinate is shown as 42, 44, and 46 respectively. Refer to FIG. 4, the three color coordinates of every pixel in the divided image (such as first color distribution 42, second color distribution 44, and third color distribution 46) corresponding to the three prime color coordinates is added by the adding process 48, then the color of the pixel in the added image is 3-dimensional. So the pixel of the divided image 50 has three color coordinates, and the color of each pixel is the superposition of the three colors.

The divided image 50 is the result of dividing the image according to three-color coordinates, and there are regions of different colors in the divided image 50, and the regions mentioned above are R2G1B1, R1G1B1, R1G2B1, R1G2B2, R2G2B2, R2G1B2. The color of the pixel within a region is the principle color of the region enclosing the foregoing pixel, such as the color of the pixel of region R2G1B1 is equal to the mixture of the following colors: principle color of region R2, principle color of region G1, and principle color of region B1. In addition, the first function, the second function, and the third function in the preferred embodiment of the present invention can be probability density function, furthermore, can be normal distribution probability density function.

One preferred embodiment of the present invention is used to smooth a three (or one) dimensional histogram to acquire probability density function, whereas, the probability density function that can be used in not confined to the examples illustrated in the embodiment.

As will be understood by persons skilled in the art, the foregoing preferred embodiment of the present invention is illustrative of the present invention rather than limiting the present invention. Having described the invention in connection with a preferred embodiment, as long as the principle used to divide the image is the same as that disclosed herein, the modification will now suggest itself to those skilled in the art. While the preferred embodiment of the invention has been illustrated and described, it will be appreciated that various changes can be made therein without departing from the spirit and scope of the invention.

What is claimed is:

1. A method for dividing an image composed of pixels into a plurality of cluster regions, wherein each pixel is classified into one of said plurality of cluster regions, said method comprising:

acquiring a three dimensional histogram of said image by counting the number of pixels of said image in three dimensional color coordinate;

smoothing said three dimensional histogram by a numerical diffusion method to obtain a function;

defining a plurality of cluster regions on said image, wherein pixels within said plurality of cluster regions correspond to a convex portion of said function;

assigning the color of each pixel of said image as a principle color of a first cluster region among said plurality of cluster regions, said principle color being equal to an average of all pixels within said cluster region, said average being equal to A/B, wherein A is a summation of color of pixels within said first cluster region, and B is equal to the number of said pixels within said first cluster region, the color of said pixel being represented by said three color coordinate, each of said plurality of cluster regions having a corresponding principle color; and jointing an unclassified pixel to one of said plurality of cluster regions according to minimum distance from said unclassified pixel to said plurality of cluster regions, said unclassified pixel being outside said plurality of cluster regions before said jointing step, after all pixels of said image being jointed to one of said plurality of cluster regions, said image being divided into said plurality of cluster regions.

2. The method as claim 1, wherein said image is a colorful image.

3. The method as claim 1, wherein said function is a probability density function.

4. The method according to claim 3, wherein said probability density function is a normal distribution probability density function.

5. A method for dividing a colorful image composed of pixels into a plurality of cluster regions, wherein each pixel is classified into one of said plurality of cluster regions, said method comprising:

acquiring a three dimensional histogram of said colorful image by counting the number of pixels of said colorful image in three dimensional color coordinate;

smoothing said three dimensional histogram by a numerical diffusion method to obtain a probability density function;

defining a plurality of cluster regions on said image, wherein pixels within said plurality of cluster regions correspond to a convex portion of said probability density;

assigning the color of each pixel of said colorful image as a principle color of a first cluster region among said plurality of cluster regions, said principle color being equal to an average of all pixels within said cluster region, said average being equal to A/B, wherein A is a summation of color of pixels within said first cluster region, and B is equal to the number of pixels within said first cluster region, the color of said pixel being represented by said three color coordinate, each of said plurality of cluster regions having a corresponding principle color; and jointing an unclassified pixel to one of said plurality of cluster regions according to minimum distance from said unclassified pixel to said plurality of cluster regions, said unclassified pixel being outside said plurality of cluster regions before said jointing step, after all pixels of said colorful image being jointed to one of said plurality of cluster regions, said colorful image being completely divided into said plurality of cluster regions.

6. The method as claim 5, wherein said probability density function is a normal distribution probability density function.

7. A method for driving an image composed of pixels into a plurality of cluster regions, wherein each pixel of said image is classified into one of said plurality of cluster regions, said method comprising:

acquiring a histogram of said image by counting the number of pixels of said image in a gray level;

smoothing said histogram by a numerical diffusion method to obtain a function;

defining a plurality of cluster regions on said image, wherein pixels within said plurality of cluster regions correspond to a convex portion of said function;

assigning the gray level of each pixel of said image as a principle gray level of a first cluster region among said plurality of cluster regions, said principle gray level being equal to an average of all pixels within said cluster region, said average being equal to A/B, wherein A is a summation of gray level of pixels within said first cluster region, and B is equal to the number of pixels within said first cluster region, the color of said pixel being represented by said three color coordinate, each of said plurality of cluster regions having a corresponding principle gray level; and jointing an unclassified pixel to one of said plurality of cluster regions according to minimum distance from said unclassified pixel to said plurality of cluster regions, said unclassified pixel being outside said plurality of cluster regions before said jointing step, after all pixels of said image being jointed to one of said plurality of cluster regions, said image being divided into said plurality of cluster regions.

8. The method as claim 7, wherein said image is a monotone image.

9. The method as claim 7, wherein said function is a probability density function.

10. The method as claim 9, wherein said probability density function is a normal distribution probability density function.

11. A method for dividing an image composed of pixels into a plurality of cluster regions, wherein each pixel is classified into one of said plurality of cluster regions, said method comprising:

acquiring a first histogram of said image by counting the number of pixels of said image in a first color coordinate;

smoothing said first histogram by a numerical diffusion method to obtain a first function;

defining a plurality of cluster regions on said image, wherein pixels within said plurality of cluster regions correspond to a convex portion of said first function;

assigning the color of first color coordinate of each pixel of said image as a first principle color of a first cluster region among said plurality of cluster regions, said first principle color being equal to an average of all pixels within said cluster region, said average being equal to A/B, wherein A is a summation of first color coordinate of pixels within said first cluster region, and B is equal to number of said pixels within said first cluster region, the color of said pixel being represented by said three color coordinate, each of said plurality of cluster regions having a corresponding first principle color;

jointing an unclassified pixel to one of said plurality of cluster regions according to minimum distance from said unclassified pixel to said plurality of cluster regions, said unclassified pixel being outside said plurality of cluster regions before said jointing step, after all pixels of said image being jointed to one of said plurality of cluster regions, said image being divided into said plurality of cluster regions;

acquiring a second histogram of said image by counting the number of pixels of said image in a second color coordinate;

smoothing said second histogram by a numerical diffusion method to obtain a second function;

defining a plurality of cluster regions on said image, wherein pixels within said plurality of cluster regions correspond to a convex portion of said second function;

assigning the color of second color coordinate of each pixel of said image as a second principle color of a second cluster region among said plurality of cluster regions, said second principle color being equal to an average of all pixels within said cluster region, said average being equal to A/B, wherein A is a summation of the second color coordinate of pixels within said second cluster region, and B is equal to the number of pixels within said second cluster region, the color of said pixel being represented by said three color coordinate, each of said plurality of cluster regions having a corresponding second principle color;

jointing an unclassified pixel to one of said plurality of cluster regions according to minimum distance from said unclassified pixel to said plurality of cluster regions, said unclassified pixel being outside said plurality of cluster regions before said jointing step, after all pixels of said image being jointed to one of said plurality of cluster regions, said image being divided into said plurality of cluster regions;

acquiring a third histogram of said image by counting the number of pixels of said image in a third color coordinate;

smoothing said third histogram by a numerical diffusion method to obtain a third function;

defining a plurality of cluster regions on said image, wherein pixels within said plurality of cluster regions correspond to a convex portion of said third function;

assigning the color of third color coordinate of each pixel of said image as a third principle color of a third cluster region among said plurality of cluster regions, said third principle color being equal to an average of all pixels within said cluster region, said average being equal to A/B, wherein A is a summation of the third color coordinate of pixels within said third cluster region, B is equal to the number of said pixels within said third cluster region, the color of said pixel being represented by said three color coordinate, each of said plurality of cluster regions having a corresponding third principle color; and jointing an unclassified pixel to one of said plurality of cluster regions according to minimum distance from said unclassified pixel to said plurality of cluster regions, said unclassified pixel being outside said plurality of cluster regions before said jointing step, after all pixels of said image being jointed to one of said plurality of cluster regions, said image being divided into said plurality of cluster regions; and transforming every pixel from said first color coordinate, said second color coordinate, and said third color coordinate to three linear independent coordinates respectively to acquire every pixel of said image having a three dimensional coordinate, said image being composed of a first color of said first color region, a second color of said second color region, and a third color of said third color region.

12. The method as claim 11, wherein said image is a colorful image.

13. The method according to claim 11, wherein said first function, said second function and said third function are probability density functions.

14. The method according to claim 13, wherein said probability density functions are normal distribution probability density functions.

* * * * *